(12) United States Patent
Van Benthem

(10) Patent No.: US 11,682,147 B2
(45) Date of Patent: *Jun. 20, 2023

(54) CONSERVATIVE RASTERIZATION

(71) Applicant: Imagination Technologies Limited, Kings Langley (GB)

(72) Inventor: Casper Van Benthem, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,409

(22) Filed: Feb. 4, 2022

(65) Prior Publication Data

US 2022/0254077 A1 Aug. 11, 2022

Related U.S. Application Data

(63) Continuation of application No. 17/088,691, filed on Nov. 4, 2020, now Pat. No. 11,276,212, which is a (Continued)

(30) Foreign Application Priority Data

Jun. 29, 2018 (GB) ..................................... 1810719

(51) Int. Cl.
 *G06T 11/40* (2006.01)
 *G06T 1/20* (2006.01)

(52) U.S. Cl.
 CPC ............... *G06T 11/40* (2013.01); *G06T 1/20* (2013.01)

(58) Field of Classification Search
 CPC .... G06T 1/20; G06T 7/10; G06T 7/13; G06T 11/40
 See application file for complete search history.

(56) References Cited

U.S. PATENT DOCUMENTS

| 5,949,428 A | 9/1999 | Toelle et al. |
| 10,235,802 B2 | 3/2019 | Barber et al. |

(Continued)

FOREIGN PATENT DOCUMENTS

GB 2511817 A 9/2014

OTHER PUBLICATIONS

Akenine-Moller et al., "A Simple Algorithm for Conservative and Tiled Rasterization," retrieved from the internet: http://fileadmin.cs.lth.se/graphics/research/papers/2005/cr/_conservative.pdf; Feb. 24, 2004; pp. 1-6.

(Continued)

*Primary Examiner* — Antonio A Caschera
(74) *Attorney, Agent, or Firm* — Potomac Law Group, PLLC; Vincent M DeLuca

(57) ABSTRACT

Conservative rasterization hardware comprises hardware logic arranged to perform an edge test calculation for each edge of a primitive and for each corner of each pixel in a microtile. Outer coverage results are determined, for a particular pixel and edge, by combining the edge test results for the four corners of the pixel and the particular edge in an OR gate. Inner coverage results are determined, for a particular pixel and edge, by combining the edge test results for the four corners of the pixel and the particular edge in an AND gate. An overall outer coverage result for the pixel and the primitive is calculated by combining the outer coverage results for the pixel and each of the edges of the primitive in an AND gate. The overall inner coverage result for the pixel is calculated in a similar manner.

19 Claims, 9 Drawing Sheets

Related U.S. Application Data continuation of application No. 16/457,472, filed on Jun. 28, 2019, now Pat. No. 10,861,204.

(56) References Cited

U.S. PATENT DOCUMENTS

| | | |
|---|---|---|
| 2015/0235340 A1 | 8/2015 | Mouri et al. |
| 2017/0024897 A1 | 1/2017 | Kilgard et al. |
| 2017/0287207 A1 | 10/2017 | Clarberg |
| 2020/0058133 A1* | 2/2020 | Sankaranarayanan ...................... G06F 17/16 |

OTHER PUBLICATIONS

Pineda, "A Parallel Algorithm for Polygon Rasterization," Computer Graphics, ACM, US; vol. 22, No. 4, Jun. 1, 1988, pp. 17-20. (Note: NPL in parent application).

* cited by examiner

FIG. 2A
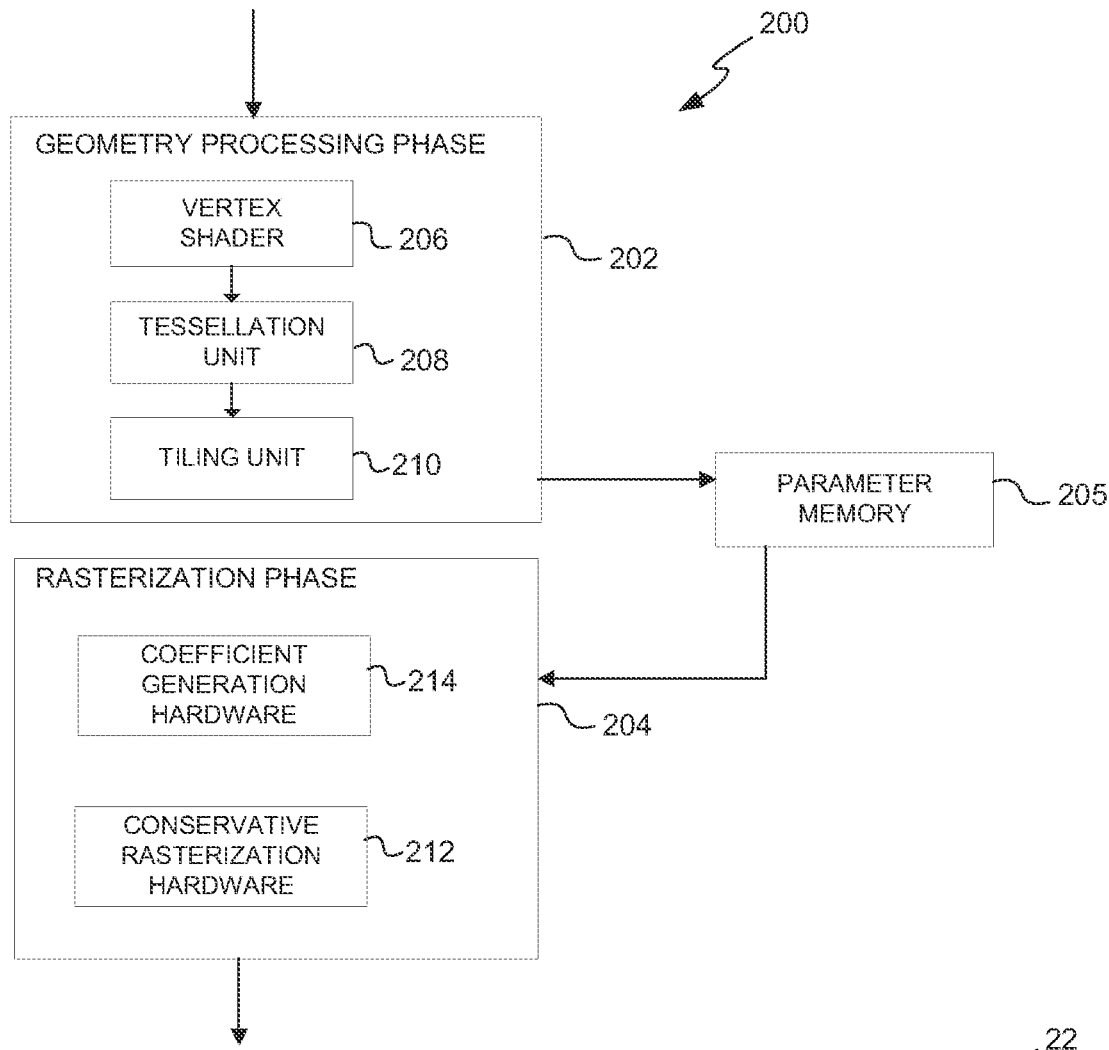
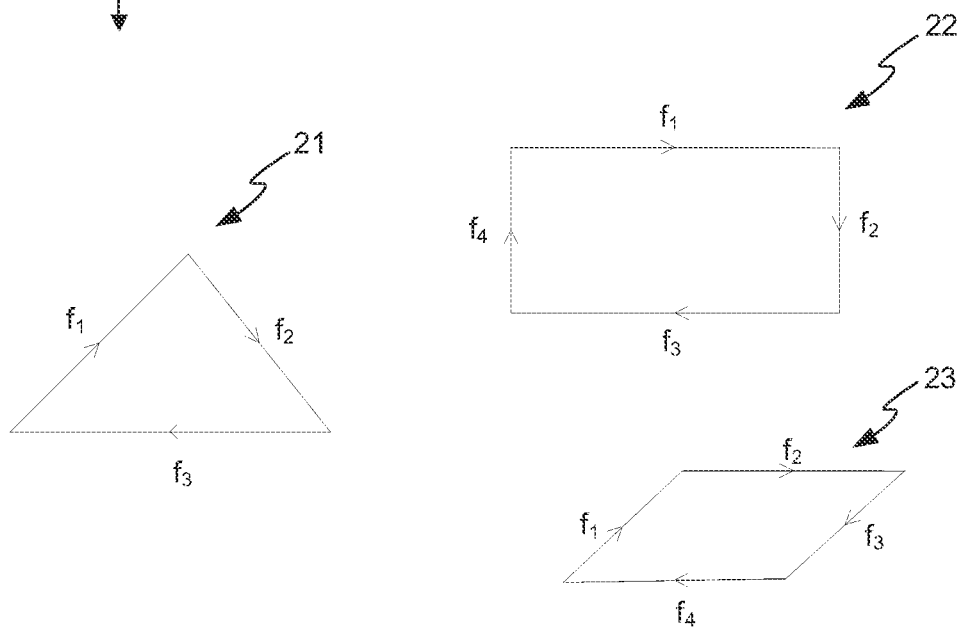
FIG. 2B

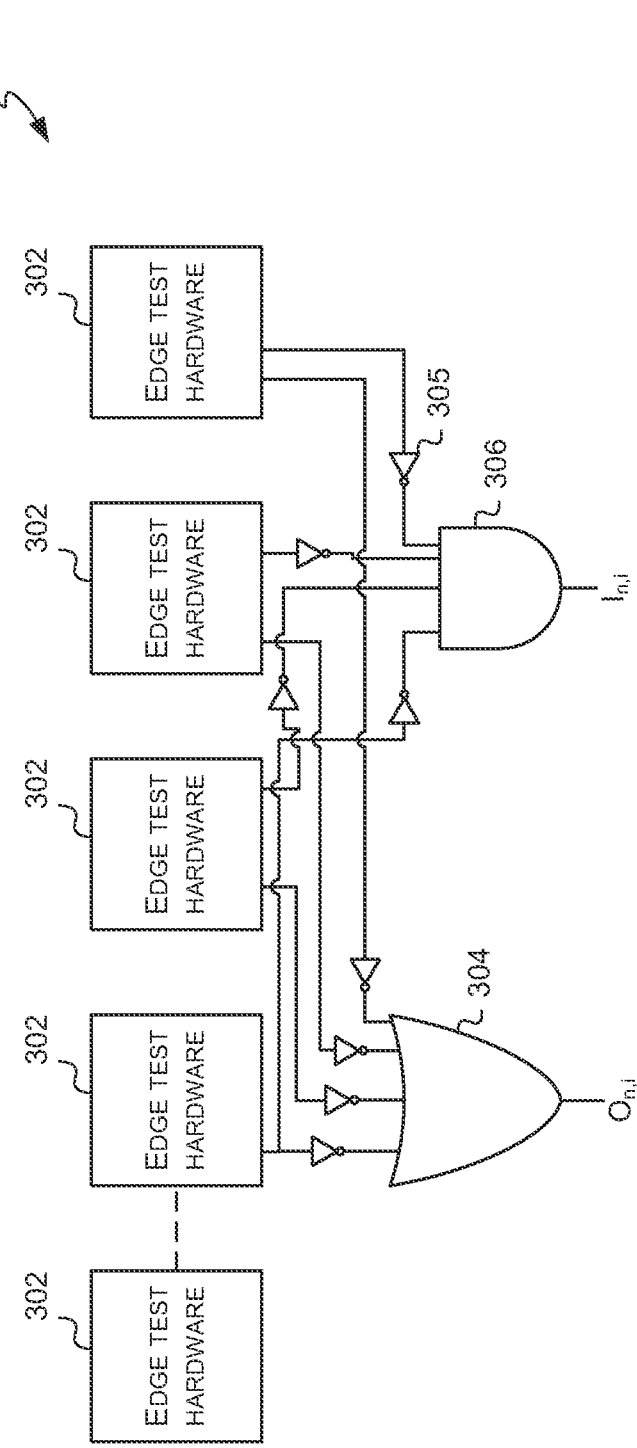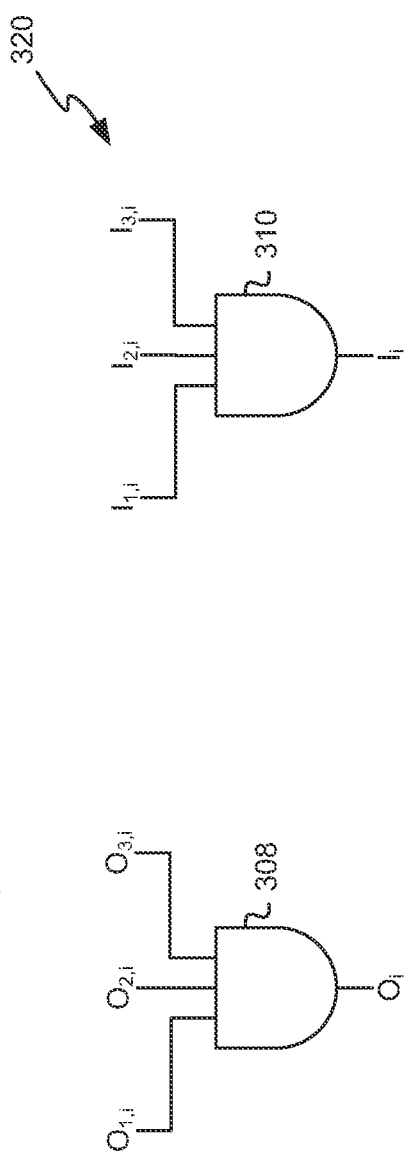

FIG. 5A
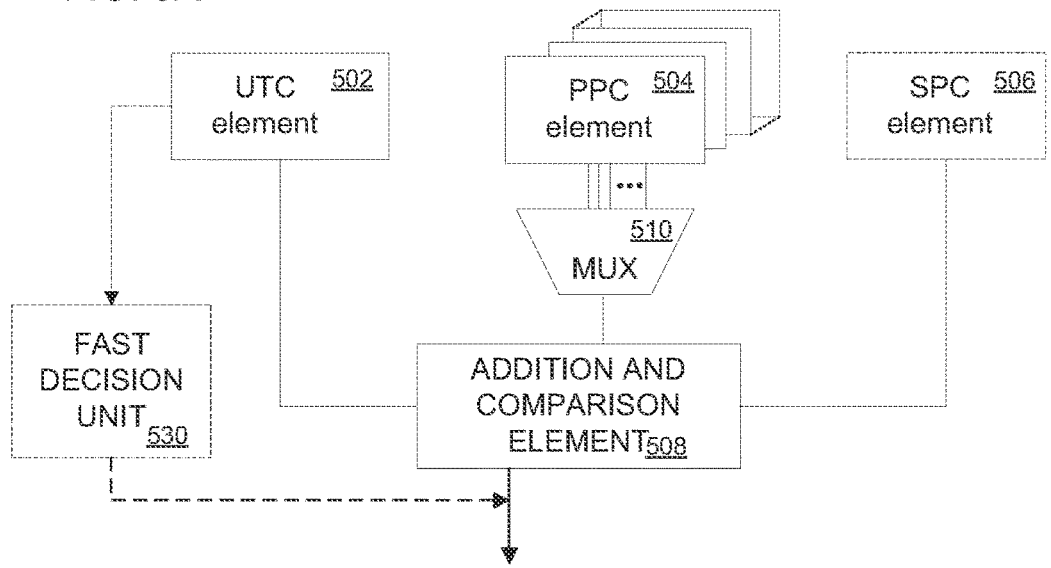
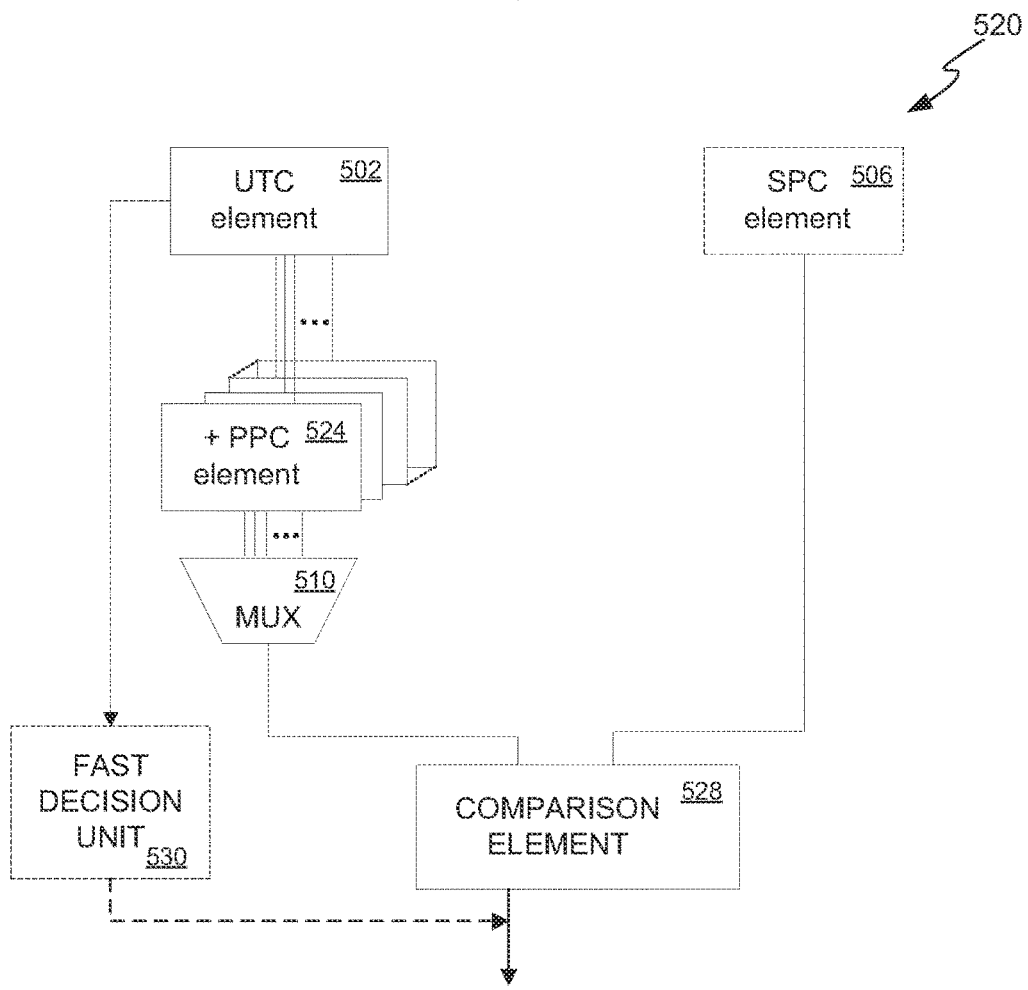
FIG. 5B

CONSERVATIVE RASTERIZATION

CROSS-REFERENCE TO RELATED APPLICATIONS AND CLAIM OF PRIORITY

This application is a continuation under 35 U.S.C. 120 of copending application Ser. No. 17/088,691 filed Nov. 4, 2020, which is a continuation of prior application Ser. No. 16/457,472 filed Jun. 28, 2019, now U.S. Pat. No. 10,861, 204, which claims foreign priority under 35 U.S.C. 119 from United Kingdom Application No. 1810719.3 filed Jun. 29, 2018.

BACKGROUND

In computer graphics, a set of surfaces representing objects in a scene is divided up into a number of smaller and simpler pieces, (referred to as primitives), typically triangles, which are more amenable to rendering. The resulting divided surface is generally an approximation to the original surface, but the accuracy of this approximation can be improved by increasing the number of generated primitives, which in turn usually results in the primitives being smaller. The amount of sub-division is usually determined by a level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene and hence increases the size of the hardware that performs the processing. Furthermore, as the average triangle size reduces, aliasing (e.g. when angled lines appear jagged) occurs more often and hence graphics processing systems employ anti-aliasing techniques which often involve taking several samples per pixel and subsequently filtering the data.

As both the number of primitives that are generated increases, the ability of a graphics processing system to process the primitives becomes more important. One known way of improving the efficiency of a graphics processing system is to render an image in a tile-based manner. In this way, the rendering space into which primitives are to be rendered is divided into a plurality of tiles, which can then be rendered independently from each other. A tile-based graphics system includes a tiling unit to tile the primitives, i.e. to determine, for a primitive, which of the tiles of a rendering space the primitive is in. Then, when a rendering unit renders the tile, it can be given information (e.g. a per-tile list) indicating which primitives should be used to render the tile.

An alternative to tile-based rendering is immediate-mode rendering. In such systems there is no tiling unit generating per-tile lists and each primitive appears to be rendered immediately; however, even in such systems, the rendering space may still be divided into tiles of pixels and rendering of each primitive may still be done on a tile by tile basis with each pixel in a tile being processed before progressing to the next tile. This is done to improve locality of memory references.

The embodiments described below are provided by way of example only and are not limiting of implementations which solve any or all of the disadvantages of known graphics processing pipelines.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A graphics processing pipeline is described which comprises conservative rasterization hardware. The conservative rasterization hardware comprises hardware logic arranged to perform an edge test calculation for each edge of a primitive and for each corner of each pixel in a microtile in parallel. Inner and outer coverage results for each pixel are then calculated. Outer coverage results are determined, for a particular pixel and particular edge, by combining the edge test results for the four corners of the pixel and the particular edge in an OR gate. Inner coverage results are determined, for a particular pixel and particular edge, by combining the edge test results for the four corners of the pixel and the particular edge in an AND gate. An overall outer coverage result for the pixel and the primitive is calculated by combining the outer coverage results for the pixel and each of the edges of the primitive in an AND gate. The overall inner coverage result for the pixel is calculated in a similar manner. This hardware performs the coverage test precisely.

A first aspect provides graphics processing pipeline arranged to render in a rendering space, wherein the rendering space is sub-divided into a plurality of tiles, each tile is sub-divided into a plurality of microtiles, each microtile comprising an identical arrangement of pixels, the graphics processing pipeline comprising conservative rasterization hardware and wherein the conservative rasterization hardware comprises: a plurality of first hardware sub-units each arranged to calculate, for a different edge of a primitive, an outer coverage result for the edge and an inner coverage result for the edge for each pixel in a microtile; and a plurality of second hardware sub-units each arranged to calculate, for a different pixel in a microtile, an outer coverage result for the primitive and an inner coverage result for the primitive, wherein each first hardware sub-unit comprises: edge test calculation hardware arranged to calculate, for each corner of the pixels in the microtile a value indicating whether the pixel corner is to the left of the edge; a plurality of OR logic blocks each configured to perform an OR operation, one for each pixel in the microtile, and each arranged to receive as inputs four values from the edge test calculation hardware, one for each corner of the pixel, and wherein an output of the OR logic block is the outer coverage result for the pixel and the edge; and a first plurality of AND logic blocks each configured to perform an AND operation, one for each pixel in the microtile, and each arranged to receive as inputs four values from the edge test calculation hardware, one for each corner of the pixel and wherein an output of the AND logic block is the inner coverage result for the pixel and the edge; and wherein each second hardware sub-unit comprises: a second plurality of AND logic blocks, one for each pixel in the microtile, and each arranged to receive as inputs an outer coverage result for the pixel and each of the edges, one from each of the first hardware sub-units and wherein an output of the AND logic block is the outer coverage result for the pixel and the primitive; and a third plurality of AND logic blocks, one for each pixel in the microtile, and each arranged to receive as inputs an inner coverage result for the pixel and each of the edges, one from each of the first hardware sub-units and wherein an output of the AND logic block is the inner coverage result for the pixel and the primitive.

A second aspect provides a method of performing conservative rasterization in a graphics pipeline arranged to render in a rendering space, wherein the rendering space is sub-divided into a plurality of tiles, each tile is sub-divided into a plurality of microtiles, each microtile comprising an identical arrangement of pixels, the method comprising: for each edge of a primitive and for each corner of a pixel in the microtile, calculating a value indicating whether the pixel corner is to the left of the edge; and for each pixel, the pixel having four corners: for each edge, combining the four calculated values in an OR logic block to generate and output an outer coverage result for the pixel and the edge; for each edge, combining the four calculated values in an AND logic block to generate and output an inner coverage result for the pixel and the edge; combining outer coverage results for the pixel for each edge of the primitive in an AND logic block to generate and output an outer coverage result for the pixel and the primitive; and combining inner coverage results for the pixel for each edge of the primitive in an AND logic block to generate and output an inner coverage result for the pixel and the primitive.

The graphics processing pipeline comprising conservative rasterization hardware may be embodied in hardware on an integrated circuit. There may be provided a method of manufacturing, at an integrated circuit manufacturing system, a graphics processing pipeline comprising conservative rasterization hardware. There may be provided an integrated circuit definition dataset that, when processed in an integrated circuit manufacturing system, configures the system to manufacture a graphics processing pipeline comprising conservative rasterization hardware. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing pipeline comprising conservative rasterization hardware.

There may be provided an integrated circuit manufacturing system comprising: a non-transitory computer readable storage medium having stored thereon a computer readable integrated circuit description that describes the graphics processing pipeline comprising conservative rasterization hardware; a layout processing system configured to process the integrated circuit description so as to generate a circuit layout description of an integrated circuit embodying the graphics processing pipeline comprising conservative rasterization hardware; and an integrated circuit generation system configured to manufacture the graphics processing pipeline comprising conservative rasterization hardware according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 2A is a schematic diagram of an example graphics processing unit (GPU) pipeline;

FIG. 2B is a schematic diagram showing the edge vectors for various primitives;

FIG. 3A is a schematic diagram showing a first part of the conservative rasterization hardware from the pipeline of FIG. 2A in more detail;

FIG. 3B is a schematic diagram showing a second part of the conservative rasterization hardware from the pipeline of FIG. 2A in more detail;

FIG. 5A shows a schematic diagram of a first example implementation of the edge test hardware from FIG. 3A in more detail;

FIG. 5B shows a schematic diagram of a second example implementation of the edge test hardware from FIG. 3A in more detail;

Figure 1A:
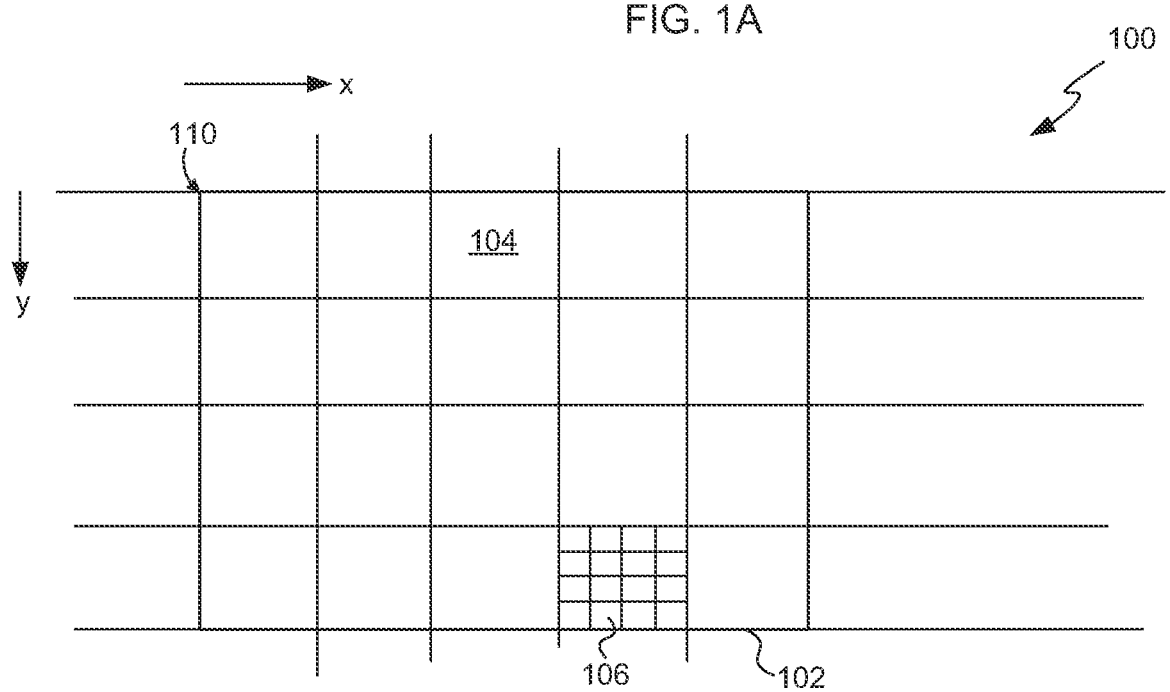
FIG. 1A is a schematic diagram of the rendering space divided into tiles and microtiles.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Described herein is hardware that performs conservative rasterization. This hardware may be implemented within the rasterization phase of a graphics processing pipeline (e.g. within a graphics processing unit, GPU). Conservative rasterization involves determining whether a square pixel area is fully overlapped by a primitive (this is referred to as 'inner coverage'), partially overlapped by the primitive (this is referred to as 'outer coverage') or not overlapped at all by the primitive. The conservative rasterization hardware described herein provides an efficient way (e.g. in terms of physical size and power consumption) to obtain both outer and inner coverage results.

The hardware described herein relies on the regular sub-division of the rendering space, as can be described with reference to FIGS. 1A and 1B. The rendering space 100 is divided into a plurality of tiles 102 (which may, for example, be square or rectangular) and each tile is further divided into a regular arrangement of smaller areas 104, referred to as 'microtiles'. Within each tile 102 there is a pre-defined arrangement of microtiles 104 and in various examples, all of the microtiles 104 are the same size. Whilst FIG. 1A shows an arrangement of 5×4 microtiles 104 within a tile 102, in other examples there may be a different number of microtiles 104 in each tile 102. Each microtile 104 comprises the same number (and arrangement) of pixels 106. In the example shown in FIGS. 1A and 1B, each microtile 104 comprises a 4×4 arrangement of 16 pixels 106.

As described in detail below, the conservative rasterization hardware described herein calculates an edge test result for the top left corner of each pixel in a microtile (as indicated by the black circles 120 in FIG. 1B) and additionally calculates an edge test result for the remaining corners of the pixels in the microtile (as indicated by the white circles 122 in FIG. 1B). For any pixel, the outer coverage result for a single edge of a primitive is obtained by combining in hardware logic (e.g. using an OR gate), the results from all four corners of the pixel and the inner coverage result for the single edge of the primitive is obtained by combining in different hardware logic (e.g. using an AND gate), the results from all four corners of the pixel. In this way, having determined the one coverage result (e.g. the outer coverage result), the other coverage result (e.g. the inner coverage result) can be obtained with minimal added cost (e.g. in terms of size and power consumption). The outer and inner coverage results for the entire primitive (rather than just a single edge of the primitive) for a particular pixel is obtained by combining in hardware logic (e.g. using an AND gate), corresponding results for the pixel for each individual edge. Using the hardware described here, the coverage test is performed precisely (i.e. without any uncertainty margin), although as described below it may create false positives.

FIG. 2A shows a schematic diagram of an example graphics processing unit (GPU) pipeline 200 which may be implemented in hardware within a GPU and which uses a tile-based rendering approach. The hardware described herein may also be used in a GPU that instead uses alternative rendering approaches where the rendering processes groups of pixels (e.g. where immediate mode rendering is used). As shown in FIG. 2, the pipeline 200 comprises a geometry processing phase 202 and a rasterization phase 204. Data generated by the geometry processing phase 202 may pass directly to the rasterization phase 204 and/or some of the data may be written to memory (e.g. parameter memory 205) by the geometry processing phase 202 and then read from memory by the rasterization phase 204.

The geometry processing phase 202 comprises a vertex shader 206, tessellation unit 208 and tiling unit 210. Between the vertex shader 206 and the tessellation unit (or tessellator) 208 there may be one or more optional hull shaders, not shown in FIG. 2. The geometry processing phase 202 may also comprise other elements not shown in FIG. 2, such as a memory and/or other elements.

The vertex shader 206 is responsible for performing per-vertex calculations. Unlike the vertex shader, the hardware tessellation unit 208 (and any optional hull Shaders) operates per-patch and not per-vertex. The tessellation unit 208 outputs primitives and in systems which use vertex indexing, an output primitive takes the form of three vertex indices and a buffer of vertex data (e.g. for each vertex, a UV coordinate and in various examples, other parameters such as a displacement factor and optionally parent UV coordinates). Where indexing is not used, an output primitive takes the form of three domain vertices, where a domain vertex may comprise only a UV coordinate or may comprise a UV coordinate plus other parameters (e.g. a displacement factor and optionally, parent UV coordinates).

The tiling unit 210 generates per-tile display lists and outputs these, for example to the parameter memory 205. Each per-tile display list identifies, for a particular tile, those primitives which are at least partially located within that tile. These display lists may be generated by the tiling unit 210 using a tiling algorithm. Subsequent elements within the GPU pipeline 200, such as the rasterization phase 204, can then read the data from parameter memory 205.

The rasterization phase 204 renders some or all of the primitives generated by the geometry processing phase 202. The rasterization phase 204 comprises the conservative rasterization hardware 212, a coefficient generation hardware block 214 and may comprise other elements not shown in FIG. 2. The coarse microtile mask and coefficient generation hardware block 214 generates the coefficients that are used in the conservative rasterization hardware 212 (e.g. A, B, and C, as defined below).

Figure 4:
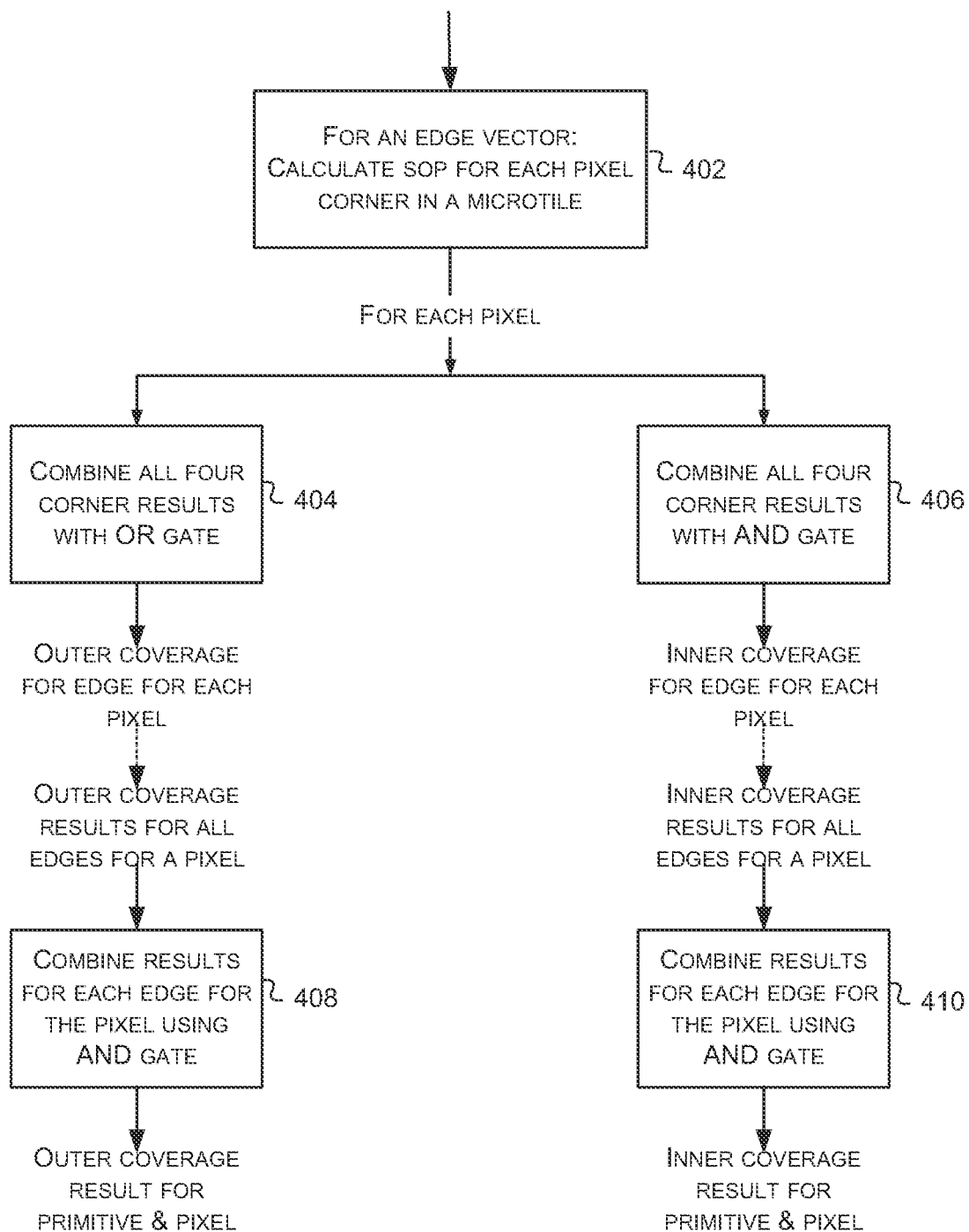
FIG. 4 is a flow diagram of an example method of performing conservative rasterization.

The conservative rasterization hardware 212 in the rasterization phase 204 determines, for each pixel and for each of a plurality of primitives (e.g. each primitive on a per-tile display list), whether the pixel (i.e. the square pixel area, rather than a single sample position within the pixel) is partially or fully overlapped by the primitive. This is referred to as outer and inner coverage respectively. The rasterization hardware 212 is shown in more detail in FIGS. 3A and 3B and its operation can be described with reference to the flow diagram in FIG. 4.

As described above and shown in FIG. 2B, each primitive 21, 22, 23 has a plurality of edges (e.g. three edges for a triangular primitive 21). Each edge is defined by an edge equation which is a vector of the form:

$$f(x,y)=Ax+By+C$$

where A, B and C are constant coefficients specific to the polygon edge (and hence may be pre-calculated) and C has been pre-adjusted such that the scene origin is translated to the tile origin. The conservative rasterization hardware 212 determines for each edge of a primitive and for each pixel corner 120, 122 in a microtile 104, whether the pixel corner (having coordinates x,y) lies to the left or right or on the edge by calculating the value, or the sign, of f(x,y) for the edge. The calculation is a sum-of-products (SOP).

FIG. 3A shows a first part 300 of the conservative rasterization hardware 212 that relates to a single pixel for a single edge. Each of the edge test hardware elements 302 calculates, for a different one of the pixel corner 120, 122, whether the pixel corner lies on the edge or to the left or right of the edge by calculating the value, or the sign, of f(x,y) for the edge (block 402). This is because:

If f(x,y) is calculated to be positive (i.e. greater than zero), then the pixel corner is to the right of the edge If f(x,y) is calculated to be negative (i.e. less than zero), then the pixel corner is to the left of the edge If f(x,y) is calculated to be exactly zero, then the pixel corner is precisely on the edge Whilst FIG. 3A only shows 5 discrete edge test hardware elements 302, it will be appreciated that there may be many more of these and the number will be dependent upon the number of pixels within a microtile (i.e. there may be one edge test hardware element 302 for each pixel corner in the microtile). If, for example, a microtile comprises a 4×4 arrangement of pixels (as shown in FIG. 1B), there may be 25 edge test hardware elements 302, one for each of the pixel corners 120, 122 in the microtile 104. Alternatively, the edge test hardware elements 302 may be combined into edge test hardware logic arranged to calculate multiple edge test results in parallel, e.g. to calculate the edge test results for each of the pixel corners 120, 122 in the microtile 104 in parallel. By combining the edge test hardware logic, efficiencies may be achieved as hardware and/or intermediate results may be reused, i.e. used in the calculation of more than one edge test result. An example of such combined hardware is described in copending UK application no. 1805608.5 and this is also shown in FIGS. 5A, 5B, 5C and 6 and described below.

Having calculated the sign (or value) of f(x,y) for each of the pixel corners in a microtile (in hardware elements 302 and block 402), there are four results (i.e. four calculated signs or values) that relate to each square pixel area 106 (one for each corner of the square pixel area), with most of the results relating to two or more square pixel areas (i.e. where a pixel corner is the corner of two or more adjacent square pixel areas) and hence the results are reused when assessing outer and inner coverage for different pixels (i.e. different square pixel areas).

To generate an outer coverage result, $O_{n,i}$, for a pixel i and edge n, (where both i and n are integers and in the example of FIG. 1B, i=[0, 24]), the negated signs of the four corner results (i.e. negated versions of all of the four calculated signs or the signs of all four calculated values from block 402) are combined using an OR gate 306 (block 404). In the example shown in FIG. 3A, the negation is performed using NOT gates 305; however, in other examples this be implemented using alternative hardware arrangements.

The outer coverage result, $O_{n,i}$, for a pixel i and edge n, is a single bit and if it is zero it indicates that the edge does not intersect any part of the square pixel area and the entire square pixel area is to the left of the edge vector.

To generate an inner coverage result, $I_{n,i}$, for a pixel i and edge n, the negated signs of the four corner results (i.e. negated versions of all of the four calculated signs or the signs of all four calculated values from block 402) are combined using an AND gate 306 (block 406). The inner coverage result, $I_{n,i}$, for a pixel i and edge n, is a single bit and if it is one it indicates that none of the corners of the square pixel area are to the left of the edge vector.

Although FIG. 3A shows a single OR gate 304 and a single AND gate 306, this is only to reduce the complexity of the diagram. The conservative rasterization hardware 212 comprises, for each edge, an OR gate 304 for each pixel in the microtile (i.e. i OR gates) and an AND gate 306 for each pixel in the microtile (i.e. i AND gates). The hardware arrangement shown in FIG. 3A may also be replicated for each edge such that in total the conservative rasterization hardware 212 comprises i×n multiplexers 304 and an i×n AND gates 306. The conservative rasterization hardware 212 further comprises n hardware elements, one for each edge, arranged to determine the gradient of the edge and generate the select signal for the i multiplexers relating to that edge. Furthermore, the OR gate 304 (and any other OR gates described herein) may alternatively be replaced by any logic block configured to perform an OR operation (e.g. not-AND-not or adding and comparing, etc.). Such a logic block that is configured to perform an OR operation may be referred to as an OR logic block. Similarly, the AND gate 306 (and any other AND gates described herein) may alternatively be replaced by any logic block configured to perform an AND operation. Such a logic block that is configured to perform an AND operation may be referred to as an AND logic block.

Having calculated outer coverage results, $O_{n,i}$, for a pixel i and each edge n, the results for the different edges are combined using an AND gate 308 (block 408) as shown in FIG. 3B, which shows a second part 320 of the conservative rasterization hardware 212. This generates a single outer coverage result $O_i$ for the pixel i and if it is zero it indicates that the primitive does not intersect any part of the square pixel area. Conservative rasterization does not permit false negatives for outer coverage results, although a small number of false positives for outer coverage results are permitted. The false positives that are obtained may be removed using a bounding box, as described below.

Having calculated inner coverage results, $I_{n,i}$, for a pixel i and each edge n, the results for the different edges are combined using an AND gate 310 (block 410) as shown in FIG. 3B. This generates a single inner coverage result $I_i$ for the pixel i and if it is zero it indicates that the primitive does not fully cover the square pixel area. The inner coverage is performed precisely and there are no inherent false positives.

As noted above, the outer coverage results obtained using the methods described above includes a number of false positives. The false positives may be removed by applying a bounding box and excluding from the outer coverage positive results, any pixels that are outside the bounding box. The bounding box is generated such that it contains the primitive and may, for example, be computed such that the vertex coordinates of the bounding box are given by the maximum and minimum x and y values of the vertices of the primitive (i.e. top left vertex=(min x, max y,), top right vertex=(max x, max y), bottom right vertex=(max x, min y), bottom left vertex=(min x, min y)). The application of the bounding box may, for example, be implemented by calculating (e.g. in advance) a mask corresponding to the bounding box for a primitive, with all those pixels which are inside the bounding box having a mask bit of one and all those pixels which are outside the bounding box having a mask bit of zero. An AND logic block can then be used to combine the single outer coverage result $O_i$ for the pixel i and the mask bit for the pixel i to generate the final outer coverage result $O_i'$ for the pixel i. The final outer coverage results for the pixels have fewer false positives than if the bounding box was not applied.

FIGS. 5A and 5B show two different example implementations of the edge test hardware 302 shown in FIG. 3A. As described above, the implementations shown in FIGS. 5A and 5B may correspond to multiple edge test hardware elements 302 and this results in a more efficient hardware implementation (e.g. in terms of physical size and power consumption).

Figure 1B:
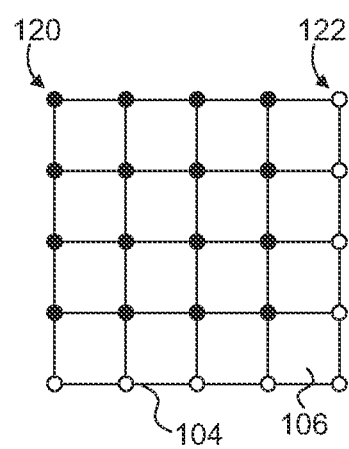
FIG. 1B is a schematic diagram showing a part of FIG. 1A in more detail.

The first example hardware arrangement 500, shown in FIG. 5A, comprises a single microtile component hardware element 502, a plurality (e.g. one for each corner of a pixel in a microtile, so 25 for the example shown in FIG. 1B) of pixel component hardware elements 504 and a plurality (e.g. at least one for each corner of a pixel in a microtile, so at least 25 for the example shown in FIG. 1B) of addition and comparison elements (which may, for example, be implemented as a plurality of adders) 508, with each addition and comparison element 508 generating an output result for a different pixel corner within the same microtile. The hardware arrangement 500 may additionally comprise one or more multiplexers 510 that connect the pixel component hardware elements 504 and optionally the microtile component hardware element(s) 502 to the addition and comparison elements 508. In examples that include multiplexers 510, one or more select signals (which may also be referred to as 'mode signals' and may comprise a one-hot signal that encodes a particular mode of operation of the hardware) control the operation of the multiplexers 510 and in particular control which combination of the hardware elements 502, 504 are connected to each particular addition and comparison element 508 (e.g. for each addition and comparison element 508, which one of the plurality pixel component hardware elements 504 is connected to the addition and comparison element 508, with each addition and comparison element 508 also being connected to the single microtile component hardware element 502).

In various examples, the hardware arrangement 500 may additionally comprise a subsample component element 506, but in such cases the output of that element may be set to zero such that it does not affect the output in any way. A subsample component element 506 may, for example, be provided where the hardware arrangement is also used for other computations, e.g. computations where there is more than one sample per pixel and/or where the output is not a fixed value.

If, as described above, the edge test hardware 302 evaluates a SOP of the form:

$$f(x,y)=Ax+By+C$$

where the values of the coefficients A, B, C may be different for each SOP evaluated, then the microtile component hardware element 502 evaluates:

$$f_{UT}(x_{UT},y_{UT})=Ax_{UT}+By_{UT}+C$$

where the values of $x_{UT}$ and $y_{UT}$ (the microtile coordinates relative to the tile origin 110), differ for different microtiles. The microtile component hardware element 502 may receive, as inputs, the values of A, B, C, $x_{UT}$ and $y_{UT}$ and the element outputs a single result $f_{UT}$.

The pixel component hardware elements 504 evaluate:

$$f_P(x_P,y_P)=Ax_P+By_P$$

for different values of $x_P$ and $y_P$ (where these values differ for different pixel corners within a microtile). The set of values of $x_P$ and $y_P$ (i.e. the values of $x_P$ and $y_P$ for all pixel corners within a microtile, as defined relative to the microtile origin) is the same for all microtiles and they may, for example, be calculated by the edge test hardware 302 or may be accessed from a look-up table (LUT). In various examples, the origin of a microtile may be defined as the top left corner of each microtile and the values of $x_P$ and $y_P$ may be integers and so the determination of the values requires little or no computation (and hence this provides an efficient implementation). Referring back to the example shown in FIG. 1A, where each microtile comprises four rows of four pixels and hence there are five rows of five pixel corners as shown in FIG. 1B, then the set of values of $x_P$ is {0, 1, 2, 3, 4} (which may also be written as [0, 4]) and the set values of $y_P$ is {0, 1, 2, 3, 4} (which may also be written [0, 4]). Each pixel component hardware element 504 receives as input A and B and may also receive the set of values of $x_P$ and $y_P$ (e.g. in examples where these are not integers). Each element 504 outputs a single result $f_P$ and consequently the calculation of $f_P$ may be merged with any calculations that are performed to determine $x_P$ and/or $y_P$.

The subsample component hardware element 506, where provided, evaluates:

$$f_S(x_S,y_S)=Ax_S+By_S$$

and as there is only a single subsample position per pixel and there is only a single value of $x_S$ and $y_S$. Consequently, there is only one value of $f_S$ and as described above, in various examples, the value of $f_S$ may be set to zero.

The addition and comparison elements 508 evaluate:

$$f(x,y)=f_{UT}+f_P$$

or, where there is a subsample component hardware element 506:

$$f(x,y)=f_{UT}+f_P+f_S$$

and each addition and comparison element 508 sums a different combination of $f_{UT}$ and $f_P$ values (where the particular combination of values are provided as inputs to the addition and comparison unit 508) and the combination is either fixed (i.e. hardwired between the elements) or is selected by one or more multiplexers 510 (where provided). To perform an edge test only the MSB (or sign-bit) of the result (i.e. of f(x,y)) is output and hence the full result does not need to be calculated by the addition and comparison element 508 and the addition and comparison element 508 may perform a comparison rather than an addition (which reduces the overall area of the hardware). This MSB indicates the sign of the result (because a>b===sign (b−a)) and, as described above, this indicates whether the pixel corner is to the left or right of the edge.

The second example hardware arrangement 520, shown in FIG. 5B, is a variation on the hardware arrangement 500 shown in FIG. 5A. This second example hardware arrangement 520 comprises a single microtile component hardware element 502, a plurality (e.g. one for each corner of a pixel in a microtile, so at least 25 for the example shown in FIG. 1B) of pixel component hardware elements 524 (although these operate slightly differently to those shown in FIG. 5A and described above) and a plurality (e.g. 64) of comparison elements (which may, for example, be implemented as a plurality of adders) 528 (although these operate slightly differently to the addition and comparison elements 508 shown in FIG. 5A and described above), with each comparison element 528 generating an output result. Like the hardware arrangement 500 shown in FIG. 5A, the hardware arrangement 520 shown in FIG. 5B may additionally comprise one or more multiplexers 510 controlled by select signals. Furthermore, in various examples, the hardware arrangement 520 may additionally comprise a subsample component element 506, but in such cases the output of that element may be set to zero such that it does not affect the output in any way.

If, as described above, the edge test hardware 302 evaluates a SOP of the form:

$$f(x,y)=Ax+By+C$$

where the values of the coefficients A, B, C may be different for each SOP evaluated, then the microtile component hardware element 502 operates as described above with reference to FIG. 5A; however, instead of the output being fed directly into the comparison element 528 (as shown in FIG. 5A), in the arrangement 520 of FIG. 5B, the output of the microtile component hardware element 502 is input to each of the plurality of pixel component hardware elements 524.

The pixel component hardware elements 524 in the arrangement 520 of FIG. 5B do not operate in the same way as those shown in FIG. 5A. They receive as input (in addition to A and B) the output from the microtile component hardware element 502, $f_{UT}$, and evaluate:

$$f_{UT}(x_{UT},y_{UT})+f_P(x_P,y_P)=f_{UT}(x_{UT},y_{UT})+Ax_P+By_P$$

for different values of $x_P$ and $y_P$ (where these values differ for different pixel corners within a microtile). As described above (with reference to FIG. 5A) the values of $x_P$ and $y_P$ (i.e. the values of $x_P$ and $y_P$ for all pixel corners within a microtile, as defined relative to the microtile origin) may be integers and hence the pixel component hardware elements 524 may comprise an arrangement of adders to add the appropriate multiples of A and/or B to the input value generated by the microtile component hardware element, $f_{UT}$, 502 and this may be implemented without using any multipliers and this reduces the size and/or power consumption of the comparison unit 528. Each element 524 outputs a single result $f_{UT}+f_P$ and as described above, the calculation of $f_P$ and hence the calculation of the single result may be merged with any calculations that are performed to determine $x_P$ and/or $y_P$.

The comparison elements 528 evaluate:

$$f(x,y)=f_{UT}+f_P+f_S$$

in a similar manner to the addition and comparison elements 408 described above; however the inputs are different since the values of $f_{UT}$ and $f_P$ have already been combined in the pixel component hardware elements 424. Each comparison element 528 sums a different combination of $(f_{UT}+f_P)$ and $f_S$ values (where the particular combinations of values are provided as inputs to the comparison units 528) and the combination is either fixed (i.e. hardwired) or is selected by one or more multiplexers 510 (where provided). To perform an edge test only the MSB (or sign-bit) of the result (i.e. of $f(x,y)$) is output and hence the full result does not need to be calculated by the comparison elements 528. This MSB indicates the sign of the result and, as described above, this indicates whether the subsample position is to the left or right of the edge.

The hardware arrangement 520 shown in FIG. 5B may utilize the fact that the value of $f_P$ can be calculated quickly or alternatively the UTC calculation may be performed in the previous pipeline stage. By using this arrangement 520 the overall area of the hardware arrangement 520 may be reduced compared to the arrangement 500 shown in FIG. 5A (e.g. the comparison elements 528 may be smaller than addition and comparison elements 408); however, each of the results output by the pixel component hardware elements 524 comprises more bits (e.g. approximately 15 more bits) than in the arrangement 500 shown in FIG. 5A.

Figure 5C:
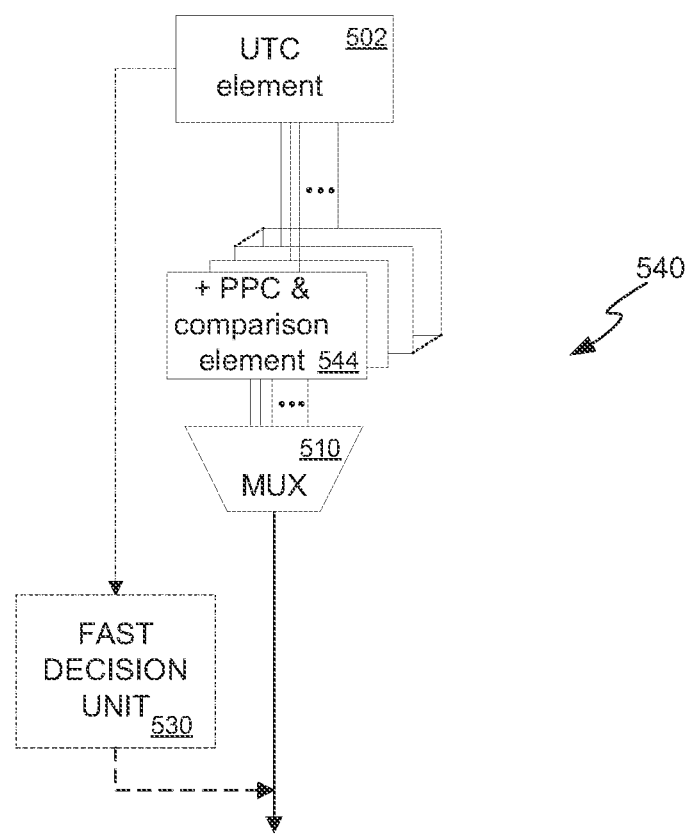
FIG. 5C shows a schematic diagram of a third example implementation of the edge test hardware from FIG. 3A in more detail.

As detailed above, in various examples there may be no subsample component hardware element 506 and in this case, the hardware arrangement 540 shown in FIG. 5C may be used. This hardware arrangement 540 is a variation on the hardware arrangement 520 shown in FIG. 5B. As shown in FIG. 5C, the comparison operation (performed by the comparison unit 528 in FIG. 5B) is combined into the addition operation (performed by the pixel component hardware elements 524 in FIG. 5B) and implemented in a single pixel component and comparison element 544. As in the hardware arrangement shown in FIG. 5B, in the hardware arrangement 540 shown in FIG. 5C, the output may be fixed (i.e. hardwired) or selected by one or more optional multiplexers 510.

Although FIGS. 5A and 5B show the hardware elements 502, 504, 506, 524 being connected to a single addition and comparison element 508, 528 (optionally via multiplexers 510), this is to reduce the complexity of the diagram only. As described above, each addition and comparison element 508, 528 generates an output result and the hardware arrangement 500, 520 is, in all examples, arranged to calculate a plurality of results (e.g. one for each pixel corner in a microtile, so 25 results for the example shown in FIG. 1B) in parallel and hence comprises a plurality of addition and comparison elements 508, 528 (e.g. at least 25 addition and comparison elements).

Although FIGS. 5A, 5B and 5C all show only a single microtile component element 502, such that all the results generated in parallel by the hardware arrangement 500, 520, 540 relate to pixel corners within the same microtile, in other examples the hardware arrangement may comprise a plurality of microtile component elements 502 and in such examples, the results generated in parallel by the hardware arrangement may relate to pixel corners within more than one microtile.

In various examples, the hardware arrangement 500, 520, 540 may further comprise a plurality of fast decision units 530 (which may also be referred to as fast fail/pass logic elements), one for each microtile and the condition is then applied to all outputs (e.g. the outputs from all of the plurality of addition and comparison elements 508, 528, 544). The fast decision unit 530 receives the output generated by the microtile component hardware element 502 and determines whether, based on the output received, any possible contributions from a pixel component hardware element 504, 524, 544 could change the value of the MSB of the value output by the microtile component hardware element 502.

If the value output by the microtile component hardware element 502, $f_{UT}$, is sufficiently positive that no pixel contribution could make the resultant $f(x,y)$ negative (after taking into consideration any edge rule adjustment), i.e. if:

$$f_{UT}>|f_{Pmin}|$$

where $f_{Pmin}$ is the minimum, i.e. most negative, possible value of $f_P$, then the hardware arrangement 500, 520 can determine whether the edge test passes or fails without evaluating the outputs generated by the pixel component hardware elements 504, 524, 544 (i.e. without completely evaluating the final sum).

Similarly, if the value output by the microtile component hardware element 502, $f_{UT}$, is sufficiently negative that no pixel could make the resultant $f(x,y)$ positive or zero, i.e. if:

$$|f_{UT}|>f_{Pmax}$$

where $f_{Pmax}$ is the maximum, i.e. most positive, possible value of $f_P$, then the hardware arrangement 500, 520, 540 can determine whether the edge test passes or fails without evaluating the outputs generated by the pixel component hardware elements 504, 524, 544 (i.e. without completely evaluating the final sum).

The implementation of the fast decision unit 530 reduces the width of the addition that is performed by each addition and comparison element 508, 528 as a number of (e.g. three) MSBs from the output generated by the microtile component hardware element 502 can be omitted from the addition. The precise number of MSBs that can be omitted is determined by the number of microtiles in a tile (i.e. how many $X_{UT}$ bits there are) and the precise constrains on coefficient C.

As described above the hardware arrangements 500, 520, 540 are all suitable for use in GPUs which use any rendering approach in which groups of pixels are processed together and this includes both tile-based rendering and immediate-mode rendering. In various examples, the hardware 520 as shown in FIG. 5B with the inclusion of a fast decision unit 530 may be particularly suited to GPUs which use immediate-mode rendering. This is because immediate-mode rendering results in a larger UTC element 502 than for tile-based rendering (because the range of coordinates may now cover the entire screen area).

The selection of which hardware arrangement 500, 520, 540 to use in any implementation will be dependent upon various factors, including but not limited to the rendering approach used by the GPU. The hardware arrangement 500 shown in FIG. 5A has less delay and fewer registers before the multiplexers 510 for the PPC elements 504, compared to the arrangement in the hardware 520 shown in FIG. 5B; however, the addition and comparison element 508 in FIG. 5A is larger and uses more power than the comparison unit 528 in FIG. 5B. Consequently, where there are a large number of addition and comparison elements 508 (e.g. 64 or more), then use of the hardware arrangement 520 shown in FIG. 5B may be more suitable. However, in the hardware arrangement 520 shown in FIG. 5B it is not possible to gate out the PPC elements 524 if only the microtile index changes, but for 64 or more outputs, the reduced complexity of the comparison unit 528 may provide a dominant effect with respect to power consumption of the hardware.

Figure 6:
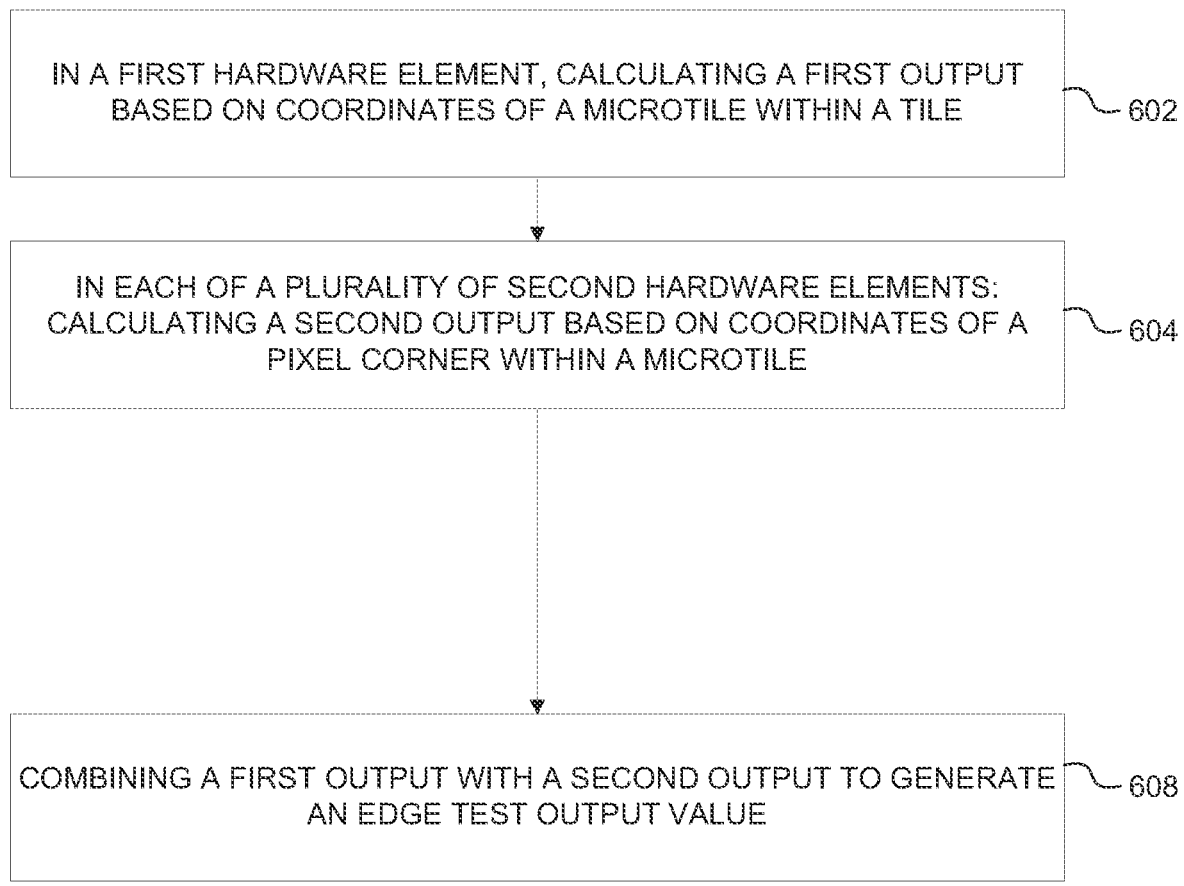
FIG. 6 is a flow diagram of an example method of performing edge detection.

FIG. 6 is a flow diagram of an example method of performing edge detection and/or depth calculation in an efficient manner (i.e. in terms of size of hardware and power consumption) for a rendering space divided into tiles and wherein each tile is subdivided into a plurality of microtiles, each microtile comprising an identical arrangement of pixels. This method uses the hardware described above and shown in FIGS. 5A, 5B and 5C and may be part of a method of rendering in a graphics processing pipeline.

The method comprises, in a first hardware element 502, calculating a first output based on coordinates of a microtile (block 602). The method further comprises, in each of a plurality of second hardware elements 504, 524, 544, calculating one of a plurality of second outputs based on coordinates of one of a plurality of pixels within the microtile, (block 604) wherein each of the plurality of second hardware elements and each of the plurality of second outputs relates to a different one of the plurality of pixel corners in the microtile. The method further comprises generating a plurality of output values by combining different combinations of the first output and one of the second outputs using one or more addition and/or comparison units (block 608), wherein each output value is an edge test output.

In the methods described above, all edges of a primitive are treated in the same way; however, if a pixel is exactly on the edge of an object, an edge rule may be applied so that the pixel is determined to be within (and hence made visible) on only one of the primitives. In various examples, the edge rule may determine that a pixel that lies on the top or left edge lies within the primitive, whereas if the pixel lies on another edge, it is considered to be outside the primitive. These edges may be defined in terms of their A and B coefficients and an example is shown for a triangular primitive in the table below:

| | TYPE | A | B | Sample on the edge will be considered to be: |
|---|---|---|---|---|
| when $f(x, y) = 0$ | Left edge | >0 | (any value) | Inside |
| | Right edge | <0 | (any value) | Outside |
| | Horizontal top edge | =0 | >0 | Inside |
| | Horizontal bottom edge | =0 | <0 | Outside |

The edge rule may, for example, be implemented by subtracting one LSB (least significant bit) in the final summations (e.g. as performed in blocks 508, 528, 544) for right or horizontal bottom edges and this LSB may be subtracted by subtracting one LSB from the output from the microtile component hardware element 502. This results in an efficient hardware implementation as it avoids any need for the comparison elements to identify situations where $f(x,y)$ is equal to zero but instead the comparison elements only need to determine the sign of $f(x,y)$ and hence whether $f(x,y) \geq 0$.

Using the hardware arrangement and method described above to determine the outer and inner coverage for each pixel in a microtile results in a hardware logic implementation of conservative rasterization that has good utilization (e.g. because it only requires a few additional SOPs to be calculated and because the computation is performed in parallel for all of the pixels in a microtile, results for common pixel corners can be reused instead of being separately calculated and, in various examples, existing hardware in the rasterization phase 204 can be reused), high performance (e.g. because it does not require any adjustment of edge coefficients or sample positions—adjustment of edge coefficients is complex to implement precisely and any adjustment introduces a delay that is worse for edge adjustments than sample position adjustments) and is both compact (in terms of physical size) and power efficient (e.g. because only a small amount of addition logic is required to calculate inner coverage once the outer coverage has been calculated and it does not require any adjustment of edge coefficients and because the computation is performed in parallel for all of the pixels in a microtile, results for common pixel corners can be reused instead of being separately calculated). Whilst in the example shown in FIG. 1B, in which a microtile comprises a 4×4 array of pixels, there are utilization benefits due to reuse of computed results, for larger arrays of pixels, the increase in utilization achieved using the methods and hardware described herein are more significant.

Figure 7:
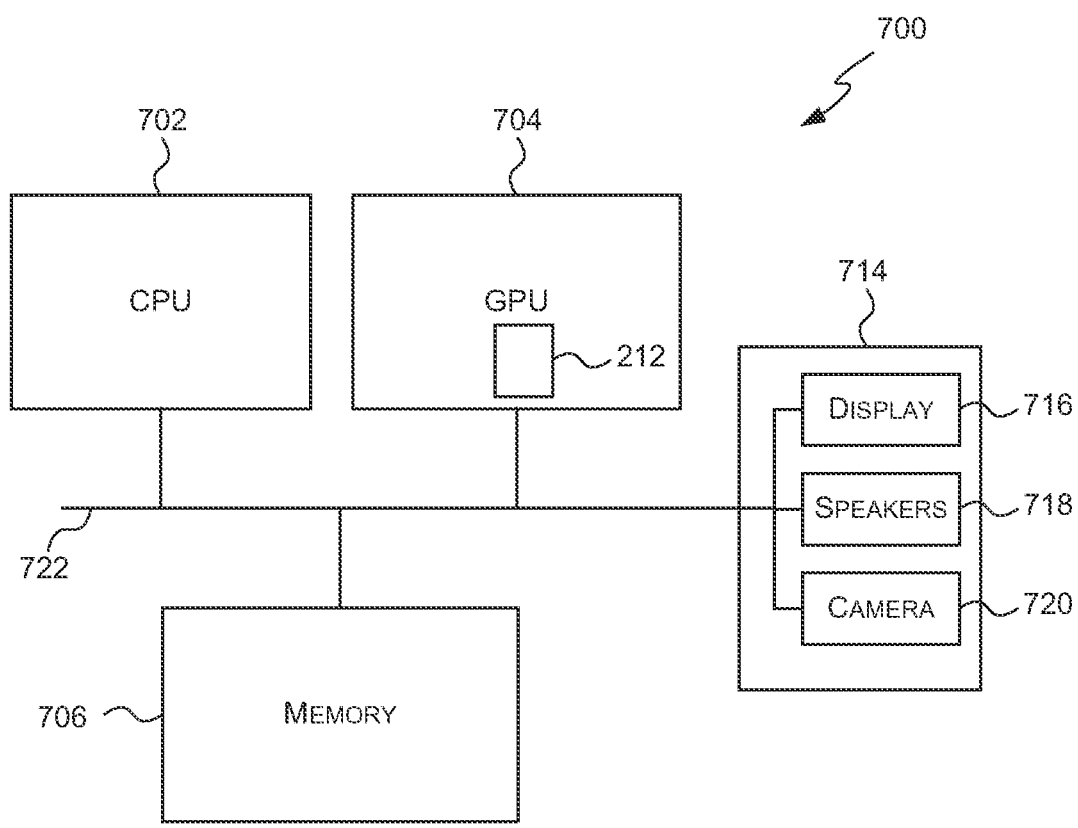
FIG. 7 shows a computer system in which a graphics processing pipeline comprising the conservative rasterization hardware is implemented.

FIG. 7 shows a computer system 700 in which the graphics processing systems described herein may be implemented. The computer system 700 comprises a CPU 702, a GPU 704, a memory 706 and other devices 714, such as a display 716, speakers 718 and a camera 720. The graphics processing pipeline, described above, and in particular the conservative rasterization hardware 212 may be implemented within the GPU 704. The components of the computer system can communicate with each other via a communications bus 722.

The hardware arrangements shown in FIGS. 2, 3A and 3B and described above are shown as comprising a number of functional blocks. This is schematic only and is not intended to define a strict division between different logic elements of such entities. Each functional block may be provided in any suitable manner. It is to be understood that intermediate values described herein as being formed by any of the elements (e.g. any of the elements in FIGS. 3A and 3B) need not be physically generated by the hardware arrangement at any point and may merely represent logical values which conveniently describe the processing performed by the hardware (e.g. the graphics processing pipeline) between its input and output.

The conservative rasterization hardware 212 described herein may be embodied in hardware on an integrated circuit. The conservative rasterization hardware 212 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing pipeline configured to perform any of the methods described herein, or to manufacture a graphics processing pipeline comprising conservative rasterization hardware described herein. An integrated circuit definition dataset may be, for example, an integrated circuit description.

Therefore, there may be provided a method of manufacturing, at an integrated circuit manufacturing system, a graphics processing pipeline comprising conservative rasterization hardware as described herein. Furthermore, there may be provided an integrated circuit definition dataset that, when processed in an integrated circuit manufacturing system, causes the method of manufacturing a graphics processing pipeline comprising conservative rasterization hardware to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing pipeline will now be described with respect to FIG. 8.

Figure 8:
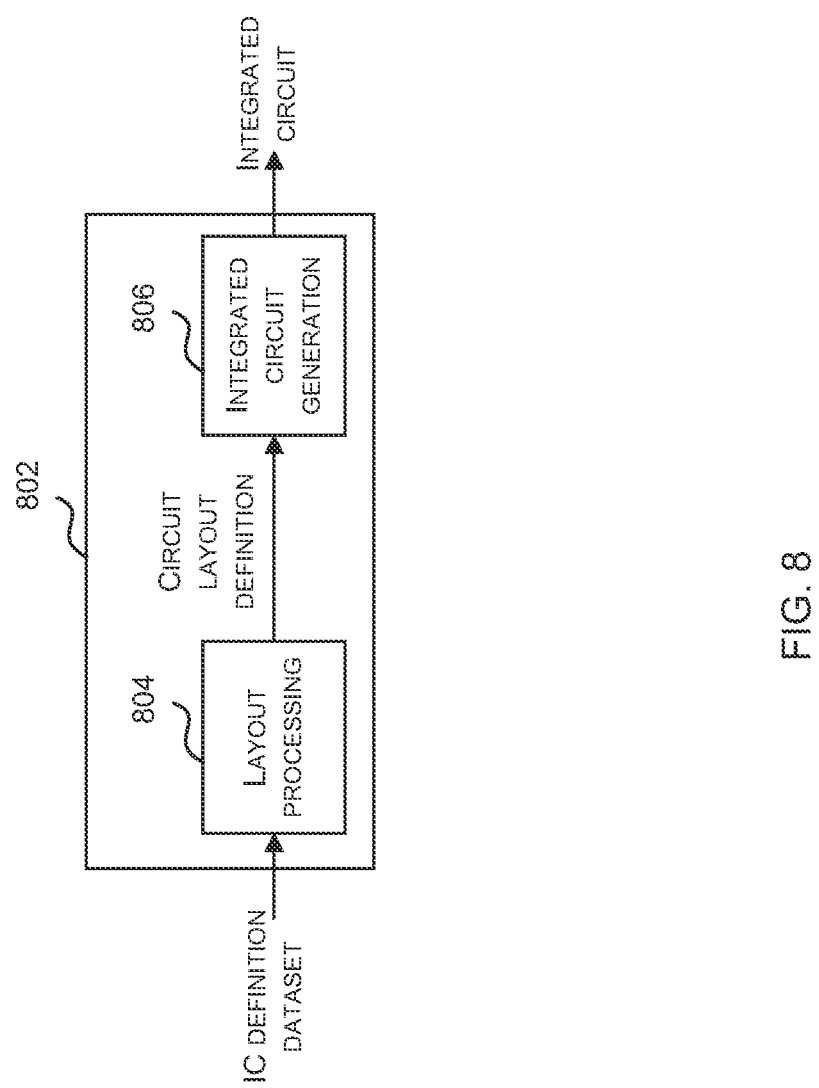
FIG. 8 shows an integrated circuit manufacturing system for generating an integrated circuit embodying a graphics processing pipeline comprising the conservative rasterization hardware described herein.

FIG. 8 shows an example of an integrated circuit (IC) manufacturing system 802 which is configured to manufacture a graphics processing pipeline comprising conservative rasterization hardware as described in any of the examples herein. In particular, the IC manufacturing system 802 comprises a layout processing system 804 and an integrated circuit generation system 806. The IC manufacturing system 802 is configured to receive an IC definition dataset (e.g. defining a graphics processing pipeline comprising conservative rasterization hardware as described in any of the examples herein), process the IC definition dataset, and generate an IC according to the IC definition dataset (e.g. which embodies a graphics processing pipeline comprising conservative rasterization hardware as described in any of the examples herein). The processing of the IC definition dataset configures the IC manufacturing system 802 to manufacture an integrated circuit embodying a graphics processing pipeline comprising conservative rasterization hardware as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing pipeline comprising conservative rasterization hardware without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits)

performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing pipeline comprising conservative rasterization hardware, and wherein the conservative rasterization hardware comprises:
    a plurality of first hardware sub-units each arranged to calculate, for a different edge of a primitive, a plurality of coverage results for an edge for each pixel in a microtile, and
    a plurality of second hardware sub-units each arranged to calculate, for a different pixel in a microtile, a plurality of coverage results for the primitive;
    wherein each first hardware sub-unit comprises:
        a plurality of OR logic blocks each configured to perform an OR operation, and each arranged to receive as inputs four values from edge test calculation hardware, one for each corner of a pixel, and wherein an output of the OR logic block is an outer coverage result for the pixel and the edge, and
        a first plurality of AND logic blocks each configured to perform an AND operation, and each arranged to receive as inputs four values from the edge test calculation hardware, one for each corner of the pixel and wherein an output of the AND logic block is an inner coverage result for the pixel and the edge;
    and wherein each second hardware sub-unit comprises:
        a second plurality of AND logic blocks, each arranged to receive as inputs an outer or an inner coverage result for a pixel and each of the edges, one from each of the first hardware sub-units and wherein an output of the AND logic block is a corresponding outer or inner coverage result for the pixel and the primitive.

2. The graphics processing pipeline according to claim 1, comprising edge test calculation hardware arranged to calculate, for each corner of the pixels in the microtile a value indicating whether the pixel corner is to the left of the edge, wherein the edge test calculation hardware comprises one or more hardware arrangements each arranged to perform an edge test using a sum-of-products, each hardware arrangement comprising:
    a microtile component hardware element comprising hardware logic arranged to calculate a first output using the sum-of-products and coordinates of a microtile within a tile in the rendering space;
    a plurality of pixel component hardware elements, each comprising hardware logic arranged to calculate one of a plurality of second outputs using the sum-of-products and coordinates for different pixel corners defined relative to an origin of the microtile;
    a plurality of adders arranged to generate a plurality of output results for the sum-of-products in parallel by combining, for each output result, a different combination of the first output and one of the plurality of second outputs.

3. The graphics processing pipeline according to claim 2, wherein each hardware arrangement further comprises:
    a subsample component hardware element, the subsample component hardware element comprising hardware logic arranged to output a fixed third output,
    and wherein the plurality of adders are arranged to generate the plurality of output results by combining, for each output result, the third output and the different combination of the first output and one of the plurality of second outputs.

4. The graphics processing pipeline according to claim 3, wherein the fixed third output is set to zero.

5. The graphics processing pipeline according to claim 2, wherein one or more of the hardware arrangements further comprises:
    a plurality of multiplexers arranged to select the different combinations of the first output and one of the plurality of second outputs.

6. The graphics processing pipeline according to claim 2, wherein the plurality of adders comprises:
    a plurality of addition and comparison elements, each addition and comparison element arranged to generate a different one of the plurality of output results by combining a different combination of the first output and one of the plurality of second outputs.

7. The graphics processing pipeline according to claim 6, wherein one or more of the hardware arrangements further comprises a first plurality of multiplexers, each of the multiplexers in the first plurality of multiplexers having a plurality of inputs and an output, wherein each input is arranged to receive a different one of the plurality of second outputs from the plurality of pixel component hardware elements and the multiplexer is arranged to select one of the received second outputs and output the selected second output to one of the plurality of addition and comparison elements via the output.

8. The graphics processing pipeline according to claim 2, wherein the plurality of adders comprises a first subset of the plurality of adders and a second subset of the plurality of adders,
wherein each of the pixel component hardware elements further comprises an input for receiving the first output from the microtile component hardware element and at least one of the first subset of the plurality of adders arranged to sum the first output received from the microtile component hardware element and the second output calculated by the pixel component hardware element to generate an intermediate result, and
wherein the second subset of the plurality of adders comprises:
a plurality of comparison elements, each comparison element arranged to generate a different one of the plurality of output results by evaluating a different one of the intermediate results.

9. The graphics processing pipeline according to claim 8, wherein one or more of the hardware arrangements further comprises a first plurality of multiplexers, each of the multiplexers in the first plurality of multiplexers having a plurality of inputs and an output, wherein each input is arranged to receive a different one of the intermediate results from the plurality of pixel component hardware elements and the multiplexer is arranged to select one of the received intermediate results and output the selected intermediate result to one of the plurality of comparison elements via the output.

10. The graphics processing pipeline according to claim 1, comprising edge test calculation hardware arranged to calculate, for each corner of the pixels in the microtile a value indicating whether the pixel corner is to the left of the edge, wherein the edge test calculating hardware comprises one or more hardware arrangements each arranged to perform an edge test using a sum-of-products, each hardware arrangement comprising:
a microtile component hardware element comprising hardware logic arranged to calculate a first output using the sum-of-products and coordinates of a microtile within a tile in the rendering space;
a plurality of pixel component hardware elements, each comprising:
hardware logic arranged to calculate one of a plurality of second outputs using the sum-of-products and coordinates for different pixel corners defined relative to an origin of the microtile;
an input for receiving the first output from the microtile component hardware element;
a plurality of adders arranged to sum the first output received from the microtile component hardware element and the second output calculated by the pixel component hardware element to generate an intermediate result; and
a comparison element arranged to generate one of the plurality of output results by evaluating the intermediate result.

11. The graphics processing pipeline of claim 1, wherein the graphics processing system is embodied in hardware on an integrated circuit.

12. A method of manufacturing, using an integrated circuit manufacturing system, a graphics processing pipeline as claimed in claim 1, comprising inputting to said system a computer readable dataset description of said graphics processing pipeline and causing said system to manufacture said graphics processing pipeline.

13. An integrated circuit manufacturing system comprising:
a non-transitory computer readable storage medium having stored thereon a computer readable dataset description of an integrated circuit that describes a graphics processing pipeline as claimed in claim 1;
a layout processing system configured to process the integrated circuit description so as to generate a circuit layout description of an integrated circuit embodying the graphics processing pipeline; and
an integrated circuit generation system configured to manufacture the graphics processing pipeline according to the circuit layout description.

14. A method of performing conservative rasterization in a graphics pipeline comprising, in one or more hardware elements:
for a pixel, the pixel having four corners:
for each edge, combining four calculated values from edge test calculation hardware, one for each corner of the pixel, in an OR logic block of at least one of said one or more hardware elements to generate and output an outer coverage result for the pixel and the edge;
for each edge, combining the four calculated values in an AND logic block of at least one of said one or more hardware elements to generate and output an inner coverage result for the pixel and the edge;
combining outer or inner coverage results for the pixel for each edge of the primitive in an AND logic block of at least one of said one or more hardware elements to generate and output an outer or inner coverage result for the pixel and the primitive.

15. The method according to claim 14, further comprising the step of: for each edge of a primitive and for each corner of a pixel in the microtile, calculating a value indicating whether the pixel corner is to the left of the edge, wherein calculating a value indicating whether the pixel corner is to the left of the edge comprises:
in a first hardware element, calculating a first output based on coordinates of a microtile within a tile;
in each of a plurality of second hardware elements, calculating a second output based on coordinates of the pixel corner within a microtile; and
combining the first output with the second output.

16. The method according to claim 15, wherein combining the first output with the second output comprises:
determining a sign of a sum of the first output and the second output.

17. The method of claim 15, wherein a plurality of values indicating whether a pixel corner is to the left of the edge are generated in parallel for different pixel corners in a microtile by combining, in each of a plurality of addition and comparison elements, a different combination of the first output and a second output.

18. A graphics processing pipeline comprising structure configured to perform the method of claim 14.

19. A non-transitory computer readable storage medium having stored thereon computer executable code that when executed causes at least one processor to perform conservative rasterization in a graphics pipeline, by:
  for a pixel, the pixel having four corners:
    for each edge, combining four calculated values from edge test calculation hardware, one for each corner of the pixel, in an OR logic block of at least one hardware element to generate and output an outer coverage result for the pixel and the edge;
    for each edge, combining the four calculated values in an AND logic block of at least one hardware element to generate and output an inner coverage result for the pixel and the edge;
    combining outer or inner coverage results for the pixel for each edge of the primitive in an AND logic block of at least one hardware element to generate and output an outer or inner coverage result for the pixel and the primitive.

* * * * *